(12) United States Patent
Mavrommati et al.

(10) Patent No.: US 6,842,185 B1
(45) Date of Patent: Jan. 11, 2005

(54) INFORMATION PROCESSING SYSTEM

(75) Inventors: Irene Mavrommati, Eindhoven (NL); Deirdre J. M. Van Velzen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/177,960

(22) Filed: Oct. 23, 1998

(30) Foreign Application Priority Data

Oct. 28, 1997 (EP) .......................................... 97203339

(51) Int. Cl.$^7$ ................................................ G09G 5/00
(52) U.S. Cl. ........................ 345/844; 345/835; 345/840; 345/854
(58) Field of Search ................................ 345/844–855, 345/814, 810, 818–823, 825, 828, 835–840, 348, 357, 349, 977

(56) References Cited

U.S. PATENT DOCUMENTS

| | | | | |
|---|---|---|---|---|
| 5,513,306 A | * | 4/1996 | Mills et al. ................. | 707/530 |
| 5,552,806 A | * | 9/1996 | Lenchik ....................... | 345/156 |
| 5,689,668 A | * | 11/1997 | Beaudet et al. .............. | 345/841 |
| 5,742,779 A | * | 4/1998 | Steele et al. ................. | 345/349 |
| 5,796,383 A | * | 8/1998 | Henshaw et al. ........... | 345/112 |
| 6,380,947 B1 | * | 4/2002 | Stead .......................... | 345/645 |

OTHER PUBLICATIONS

"Dynamic Icon Presentation", IBM Technical Disclosure Bulletin, vol. 35, No. 4B, Sep. 1992, pps 227–232.

* cited by examiner

*Primary Examiner*—Sy D. Luu
(74) *Attorney, Agent, or Firm*—Gregory L. Thorne

(57) ABSTRACT

In an information processing system (300), a first sequence (202) of icons are displayed one after the other in a field (204) on the display (312). The icon (204) being displayed is made selectable to the user of the system. Upon selection of a particular icon (204) of the first sequence, a second sequence (208) of icons associated with the selected icon of the first sequence are displayed one after the other in another field (214) on the display. The sequences of icons, displayed in the different fields, constitute a hierarchical two-level menu structure which can now be realized with only two fields on the display.

20 Claims, 3 Drawing Sheets

INFORMATION PROCESSING SYSTEM

BACKGROUND OF THE INVENTION

1. Field of the Invention

The invention relates to an information processing system comprising:

a display, processing means, arranged for displaying in a first field on the display a first sequence of first icons in a timed loop and for repeatedly making the currently displayed first icon selectable, and selecting means, arranged for selecting the selectable first icon.

The invention further relates to a method for enabling a user to select an icon from a set of icons comprising a plurality of first icons, said method comprising the steps of:

displaying the first icons in a timed loop in a first field on a display and repeatedly making the currently displayed first icon selectable, and detecting a selection of the selectable first icon.

2. Description of Related Art

Such an information processing system and method are known from the article "Dynamic icon presentation", IBM Technical Disclosure Bulletin, Vol. 35, No. 4B, September 1992, pages 227–232. In the known system, an icon represents a certain task or application program, e.g. a mail program, and selection of that icon results in the execution of that program. A number of icons are grouped together into a set and each icon of the set is presented in a timed sequence. The icons are shown one after the other in a single field on the display. The icon which is displayed at a certain moment can be selected and its selection causes the associated program to be executed. The known system allows a user to select an icon from among one series of icons using one field on the display.

BRIEF SUMMARY OF THE INVENTION

It is an object of the invention to provide an information processing system of the kind set forth with an improved organisation of icons. This object is achieved according to the invention in an information processing system that is characterised in that the processing means are arranged for displaying, upon detection of the selection of the selectable first icon, in a second field on the display a second sequence of second icons in a timed loop and for repeatedly making the currently displayed second icon selectable, and the selecting means are arranged for selecting the selectable second icon.

By displaying a particular second sequence of icons in the second field when a particular icon of the first sequence of icons has been selected, the system according to the invention allows for a hierarchical menu structure with icons, using only two fields on the display. A hierarchical menu is an efficient and effective mechanism for supporting the user in selecting an icon from a relatively large number of icons. The icons are organised into a number of groups according to some criterion and the user first selects a group of icons rather than directly selecting an icon from the large number of icons. The invention realises these advantages of a hierarchical menu with a limited number of fields. This leaves the rest of the space of the display available for presenting information or for other fields with selectable icons. The menu structure with fewer selectable fields is easier to use since it is less confusing and reduces the risk of errors. Furthermore, since the number of selectable fields on the display is low, the fields may be designed to be larger, thereby allowing larger icons. A larger icon may result in a better, higher quality image of the icon, which improves the identification of the icon. Furthermore, such larger icons may be used to present through the images, information to the user.

An embodiment of the information processing system according to the invention includes the display of an information item corresponding to the selected icon. Since the information item is displayed in the output field on the display, while the first field with the selected icon is still visible by the user, the relation between the outputted information item and the selected first icon is directly clear to the user. This reassures the user that the information item is displayed in response to the selected first icon. This is advantageous compared to a system where an icon is selected in one screen on the display and, in response to that, a completely new screen on the display is shown with the desired information item. In the information processing system according to the invention, in addition to the second sequence of second icons, the information item is displayed, and may therefore be used to provide information about the selected first icon and/or to further explain the second sequence of second items.

An embodiment of the information processing system according to the invention includes the display of an information item corresponding to a second selected icon. As with the selected first icon, the simultaneous display of the selected second icon and the outputted information item directly demonstrates the relation between those two. The information item displayed in response to a selection of a second icon may constitute a piece of information desired by the user.

It is a further object of the invention to provide a method of the kind set forth with an improved organisation of icons. This object is achieved according to the invention in a method that is characterised in that the set of icons comprises a plurality of second icons and in that the method further comprises the steps of:

displaying, upon detection of the selection of the selectable first icon, the second icons in a timed loop in a second field on the display and repeatedly making the currently displayed second icon selectable, and detecting a selection of the selectable second icon.

The method according to the invention allows selection of an icon from a hierarchy of icons, using only two fields on the display. Selecting an icon from the sequence of icons displayed in the first field corresponds to choosing an icon from the first level of the hierarchy. Subsequently selecting a second icon from the sequence displayed in the second field corresponds to choosing an icon from the particular second level of the hierarchy depending on the chosen icon on the first level. The method according to the invention is advantageous with respect to the known method where an icon would be selected through a single selection from a large unstructured set of icons. It would take a long time to present all the icons and it would be difficult to maintain an overview of the available icons. The method according to the invention is also advantageous with respect to a method that would simultaneously display all available icons in respective fields on the display. This would require a large number of fields on the display, cluttering the screen on the display and leaving only limited space for input or output of other information.

The method according to the invention can be exploited in a database management system used as an information retrieval system. Numerous applications are possible for such a system: retrieval of documents from a document management system, retrieval of travel information based on a stepwise refined specification of a destination, retrieval of departure and arrival times of trains, and many other applications.

BRIEF DESCRIPTION OF THE DRAWINGS

Further advantageous embodiments of the invention are cited in the dependent claims.

The invention and its attendant advantages will be further elucidated with the aid of exemplary embodiments and the accompanying schematic drawings, wherein.

Corresponding features in the various Figures are denoted by the same reference symbols.

DETAILED DESCRIPTION OF THE INVENTION

Figure 1:
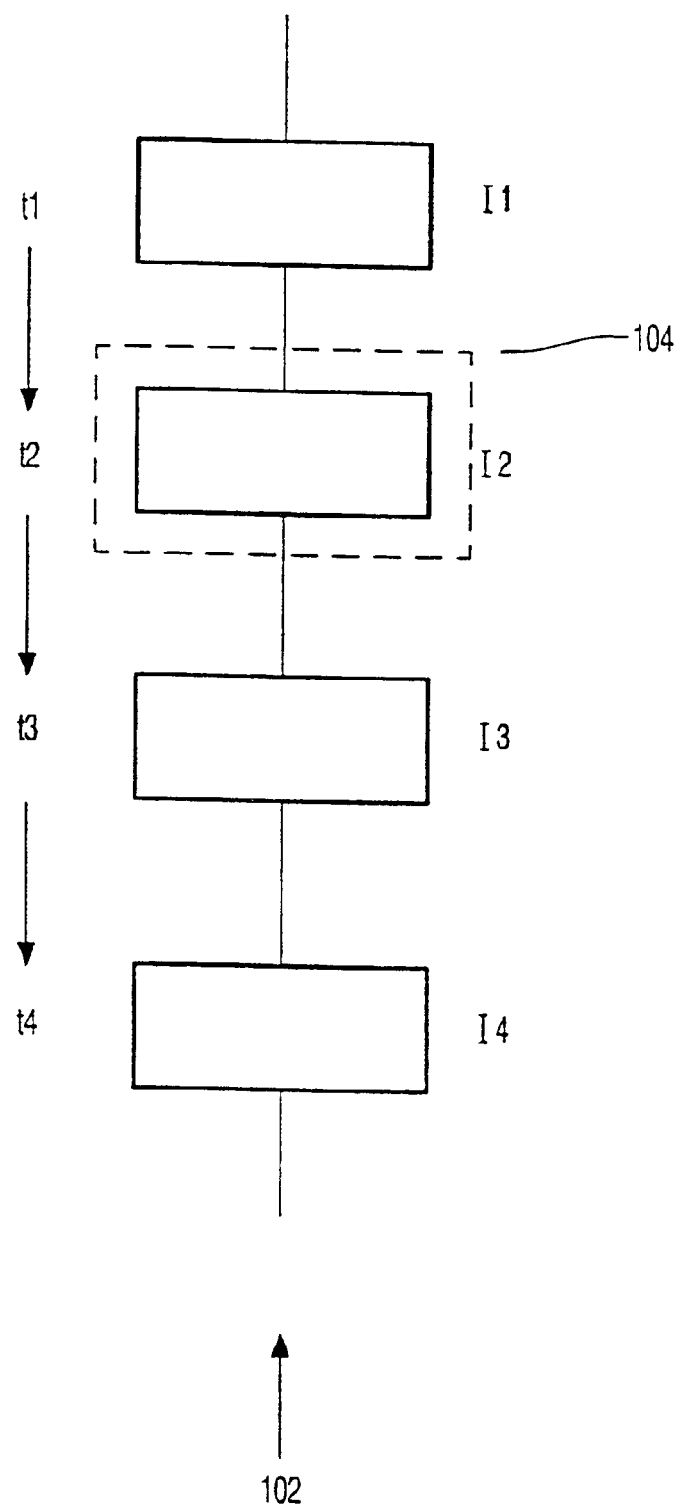
FIG. 1 schematically shows the principle of displaying a sequence of icons in a field on the display.

FIG. 1 schematically shows the principle of displaying a sequence of icons in a field on the display. A sequence 102 comprises 4 icons, 11, 12, 13 and 14, which are displayed one after the other. An icon remains visible in field 104 on the display for a certain period of time, after which it is replaced by its successor in the sequence. During the period that the icon is visible, the icon is made selectable, i.e. during that period the icon may be selected by a user. The selection process can for instance be implemented by the known point and click mechanism for selecting an icon. In this mechanism, the user moves a cursor over the screen on the display to the desired icon-position by means of an input device, like a mouse or track ball or other pointing device. When the cursor is at the desired position, the user makes the selection by clicking, or in some applications double-clicking, a button of the input device. Selection of the visible icon results in the execution of the task corresponding to that icon. The sequence in which the icons appear preferably corresponds to a loop, so that after displaying icon 14, icon 11 is displayed again and made selectable. In this way, the system keeps displaying icons from sequence 102 until the user selects an icon.

Figure 2:
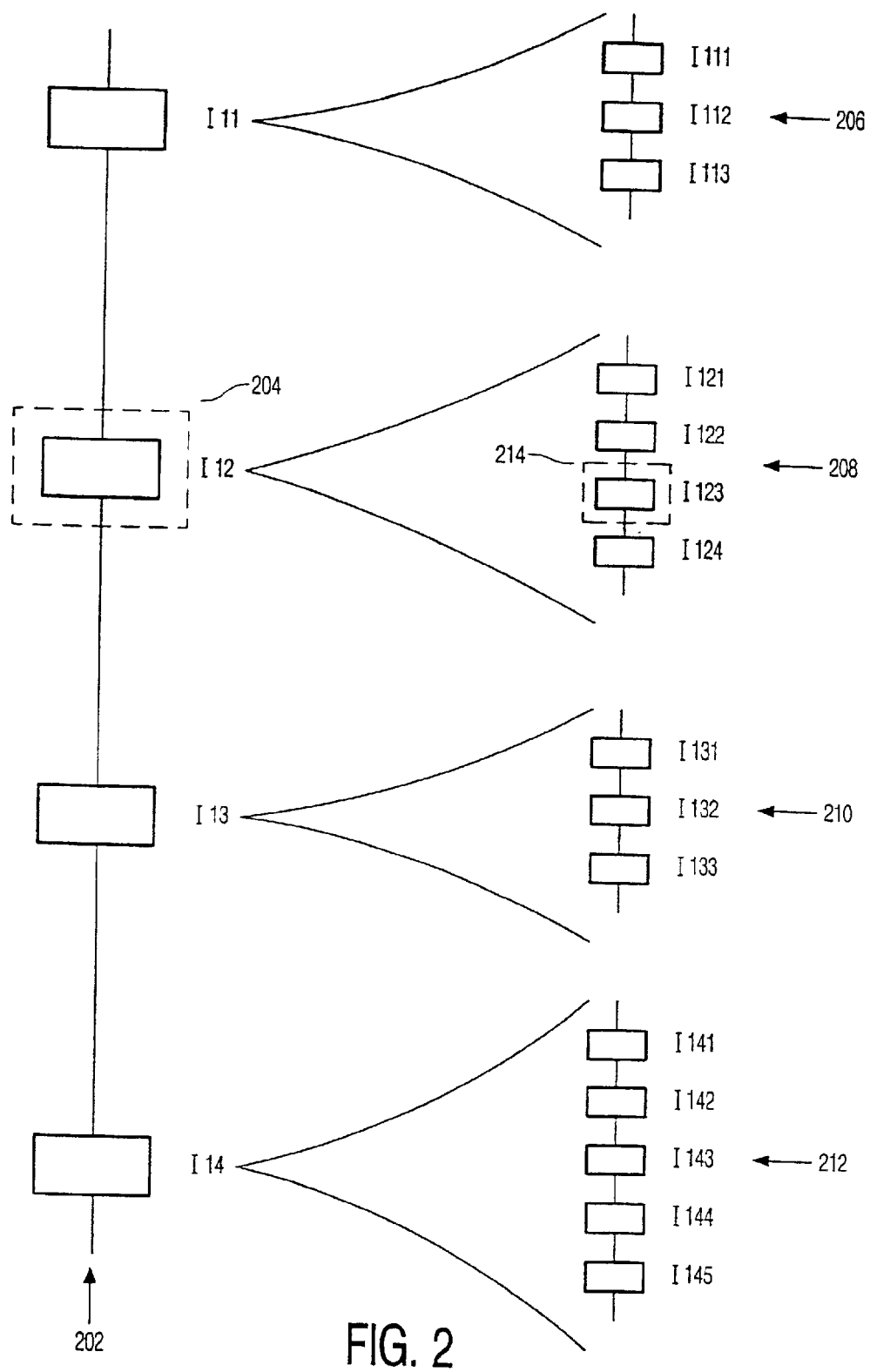
FIG. 2 shows the principle of displaying two sequences of icons in respective fields on the display according to the invention, FIG. 3 schematically shows the most important components of the information processing system according to the invention.

FIG. 2 shows the principle of displaying two sequences of icons in respective fields on the display according to the invention. A sequence 202 comprises 4 icons, which are displayed one after the other in a first field 204 on the display. As described above, the icon which becomes visible in the field 204 can be selected by the user. An icon of sequence 202 has an associated second sequence of second icons. In the figure, icon I11 has an associated second sequence 206, icon I12 has a second sequence 208, I13 has a second sequence 210, and I14 has a second sequence 212. A second sequence comprises a number of icons, which is not necessarily the same as the number of icons in sequence 202. The icons of the second sequence are displayed one after the other in a second field 214 on the display. When an icon of the second sequence is visible, it can be selected by the user. Selection of this icon results in the execution of the task which is represented by it. This may be the execution of a program, the retrieval of an information item, or some other kind of task available in the information processing system.

Using the sequences shown in FIG. 2, the following example further explains the operation of the invention. In field 204, the icons of sequence 202 are displayed one after the other. At a certain moment, icon I12 is displayed and selected by the user. Then, as a consequence of that selection, the icons of sequence 208 are displayed one after the other in field 214 on the display. Subsequently the user chooses the desired icon from sequence 208 by selecting it when it has become visible in display field 214. In the example shown, the user can select icon I123 since that icon is visible and selectable.

If selection of an icon from sequence 202 has not taken place yet, there is no specific sequence that is to be displayed in field 214. In this case, a default sequence may be displayed in that field. Alternatively, no sequence at all is displayed in field 214. When selection of an icon from sequence 202 has taken place, the associated sequence of icons is displayed in field 214. The example of FIG. 2 shows a hierarchical menu structure of two levels. The first level is formed by sequence 202 and the second level is formed by the sequences 206–208. The invention effectuates the hierarchical menu structure with only two fields on the display. It will be clear that the two levels and two fields serve as an example only and that further levels may be included according to the principle of the invention. In that a case, a second icon of a second sequence in turn has an associated sequence of icons which upon selection, is displayed in a third field on the display.

In a preferred embodiment, selection of an icon from the lowest level, in FIG. 2 an icon from one of the sequences 206–212, results in the display of an information item in a dedicated output field on the display. Such an information item may be a single item, like a textual message or a photographic image, or it may be a sequence of items displayed one after the other, like a number of messages, a number of still images or even a video. In this embodiment, the field 214, comprising the selected icon, and the dedicated output field, comprising the result of the selection, are shown simultaneously in the same screen on the display. This gives the user a feeling of directness since the selected icon and its result are shown in a single screen on the display without swapping between screens. This directness reassures the user that the presented information item is indeed the consequence of selection of the icon. This preferred embodiment may advantageously be used as an information retrieval system with a database including a number of information items, in which the information items are selected through the selection of icons in subsequent sequences. In such an embodiment, the number of levels will generally be larger than two. The selection of an icon in the first sequence results in a rough selection being made among the information items, and in subsequent selections of icons make the selection becomes finer and finer until the desired information item has been selected.

An information item is not only displayed in response to the selection of an icon at the lowest level, also the selection of an icon at a higher level may result in the display of an information item in the output field. The selection of such a higher-level icon has two results: the associated sequence of icons is displayed in the appropriate field on the display and an associated information item is displayed in the output field on the display. In such a case, the information item may introduce or explain the associated sequence, supporting the user in the selection process.

Figure 3:
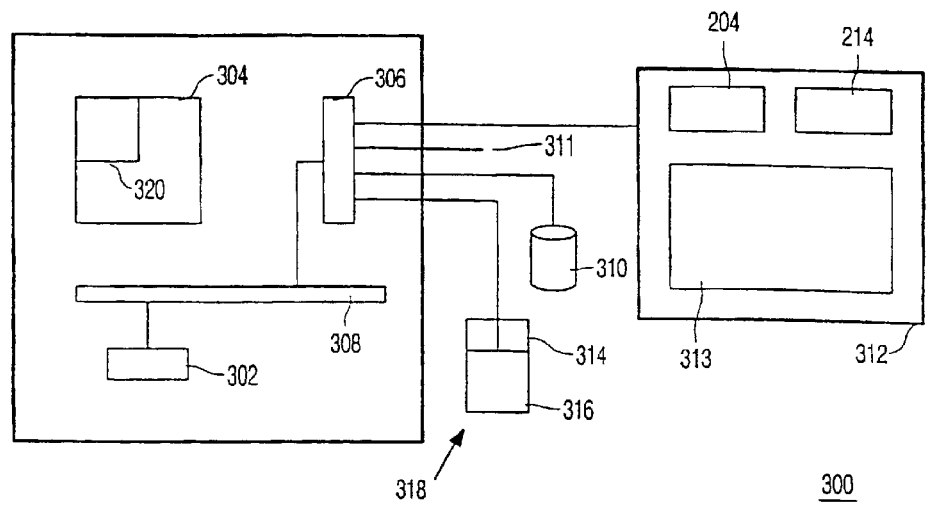

FIG. 3 schematically shows the most important components of the information processing system according to the invention. The information processing system 300 is built according to known architecture and can be implemented on a general purpose computer. The information processing system has a processor 302 for carrying out instructions from an application program loaded into working memory 304. The information processing system further has an interface 306 for communication with peripheral devices. There is a bus 308 for exchange of commands and data between the various components of the system. The peripherals of the information processing system include a storage medium 310 containing the executable programs, the sequences of icons, the set of information items, and various other data. The storage medium 310 can be embodied so as to comprise as various separate devices, which may be of different kinds of storage devices. Application of the invention is not restricted by the type of device, and storage devices which can be used include optical discs, magnetic discs, tapes, chip cards, solid state devices or some combination of these devices. Furthermore, some of the data may be at a remote location and the information processing system may be connected to such a location by a network via connection 311. The peripherals of the information processing system further include a display 312 on which the system displays, amongst other things, fields 204 and 214 and output field 313. Furthermore the peripherals include a selection device 314 and a pointing device 316 with which the user can move a cursor on the display. Devices 314 and 316 can be integrated into one selecting means 318, like a computer mouse with one or more selection buttons. However, other devices like a track ball, graphic tablet, joystick, or touch-sensitive display are also possible. In order to carry out the various tasks, a number of software modules are loaded into the working memory 304, one of said modules being the module constituting processing means 320 for controlling the display and selection of the sequences in the fields on the display.

Figure 4:
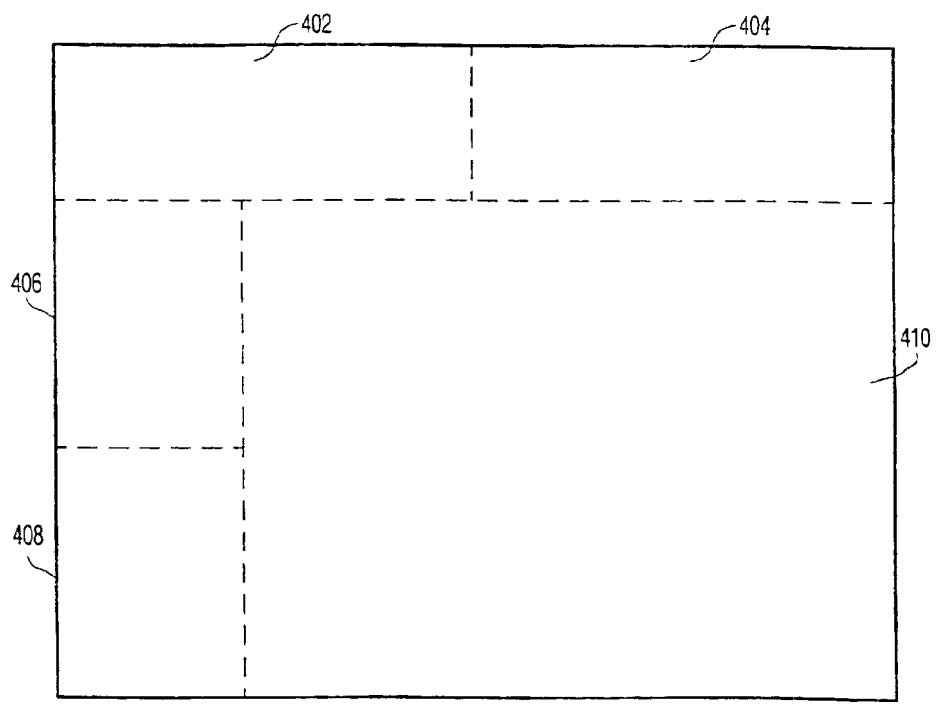
FIG. 4 shows a further example of the display according to the invention.

FIG. 4 shows a further example of the display according to the invention. The display 400 comprises a number of fields, 402–408, in which sequences of icons may be displayed and where icons may be selected as described above. The fields are relatively large and may serve, in addition to allowing the user to make a selection, they can be used for presenting information to the user. The icons may be designed in such a way that they contain information for the user. This may be in the form of images or textual messages, conveying information for the user. The display further comprises an output field 410 for displaying an information item after a selection of an icon has been made. However, in the absence of a selection an information item may also be displayed as some default item. The information item may be related to a sequence of icons displayed in one of the fields 402–408. The information item may be a single item or it may comprise a sequence of sub-items, like the images in a slide show or the pages in a document.

An information processing system for presenting information to a user may be embodied so as to fulfil two completely different functions. On the one hand, the system may be of a 'broadcast' type, in which the information is presented to the user in a sequential way without interruption and without any user interaction. This is for example course material presented via a VCR (video cassette recorder); once the playback function has been activated, the information is presented without interruption and without giving the user adequate control over the presented material. In this type of system, the system is in control and the user plays a passive role. On the other hand, the system may be organised as an encyclopaedia. The user must fully specify the information item he desires and the system retrieves and presents this information item. The user must specify the next desired information item and the system then retrieves and presents this next information item. In this approach, the user is in control and has to play a very active role.

Thus, the information processing system according to the invention provides a system that may function in either one of the two ways, depending on the instantaneous user. The system may present through the display of sequences of icons in a number of respective fields and through the output field, a continuous flow of information. This information flow may be consumed by the user in a passive way. The system continues to present information also if no specific user interaction takes place. However, the user may select a particular icon, representing an item of interest, to control the further actions of the system. The result of such selection includes the display of sequences of icons associated with the particular icon in respective fields and the display of the information item associated with the particular icon in the output field. After the selection, the user may either play a passive role or may continue to select particular icons. So the information system according to the invention offers a mixture of the two completely different types described above. This is advantageous in particular for a system application that is offered to a very large number of users, whereby there is a large difference in skill between the users operating such an application. Novice users may remain passive but will still receive information, while more expert users may actively access the system with specific needs for certain information items. An example of such a system may be an Internet site where a company presents itself. The application presents the company on a broad, general level allowing the user to zoom in through some selections, while interaction between user and system is limited or absent. A user requesting specific information, like product information, can use the application to find this information by selecting the appropriate icons displayed by the application.

What is claimed is:

1. An information processing system comprising:
a display,
a processor that is configured to:
display a first sequence of first icons in a first field on the display in a first timed loop wherein the first field is configured to contain a single first icon as a currently displayed first icon, and
repeatedly-make the currently displayed first icon selectable, and selecting means, arranged for selecting the currently displayed first icon,
wherein,
upon selection of the currently displayed first icon,
the processor is further configured to:
terminate the first timed loop while continuing to display the currently displayed and selected first icon in the first field,
display, in a second field on the display that is distinct from the first field, a second sequence of second icons in a timed loop wherein the second field is configured to contain a single second icon as a currently displayed second icon, while the selected first icon is displayed in the first field, and
repeatedly make the currently displayed second icon selectable, and
the selecting means is further arranged for selecting the currently displayed second icon, and
upon selection of the currently displayed second icon,
the processor is further configured to:
terminate the second timed loop while continuing to display the currently displayed and selected icon in the second field.

2. An information processing system as claimed in claim 1, wherein, upon selection of the displayed first icon,
the processor is further configured to
display an information item in an output field on the display that is distinct from the first field and the second field.

3. An information processing system a claimed in claim 2, wherein
the information item comprises a sequence of information sub-items in a third timed loop.

4. An information processing system as claimed in claim 1, wherein, upon selection of the displayed second icon, the processor is further configured to
display an information item in an output field on the display that is distinct from the first and second fields.

5. An information processing system as claimed in claim 4, wherein
the information item comprises a sequence of information sub-items displayed in a timed loop.

6. An information processing system as claimed in claim 1, wherein the processor is further configured to progressively display other selectable icons in timed loops in other fields on the display as the selectable icons ate progressively selected,
wherein
each of the other fields is distinct from each other and form the first and second fields.

7. An information processing system as claimed in claim 1, wherein
each of the first and second fields has a size that is independent of a quantity of first and second selectable icons.

8. A method for enabling a user to select icons from a hierarchy of sets of icons, comprising:
sequentially displaying each icon of a first set of icons corresponding to a first level of the hierarchy of icons in a first timed loop in a first field on a display wherein the first field is configured to contain a single first icon as a currently displayed first icon,
repeatedly making the currently displayed first icon in the first field a selectable first icon,
detecting a selection of the currently displayed first icon, and,
upon detection of the selection of the currently displayed first icon,
terminating the first timed loop and continuing the display of the currently displayed first icon in the first field,
displaying each icon of a second set of icons corresponding to a second level of the hierarchy corresponding to the first icon, in a second timed loop in a second field on the display while the first icon is displayed in the first field, the second field being distinct from the first field, wherein the second field is configured to contain a single second icon as a currently displayed second icon,
repeatedly making the currently displayed second icon in the second field a selectable second icon, and
detecting a selection of the currently displayed second icon, and,
upon detection of the selection of the currently displayed second icon,
terminating the second timed loop and continuing the display of the currently displayed second icon in the second field.

9. A method as claimed in claim 8, further comprising
displaying, upon selection of the selectable first icon, an information item in an output field on the display that is distinct from the first field and the second field.

10. A method as claimed in claim 9, wherein the information item comprises a plurality of information sub-items displayed in a third timed loop.

11. A method as claimed in claim 8, further comprising:
upon selection of the selectable second icon,
displaying an information item in an output field on the display that is distinct from the first and second fields.

12. A method as claimed in claim 11, wherein
the information item comprises a plurality of information sub-items displayed in a timed loop.

13. The method as claimed in claim 8, further comprising:
displaying each icon of successive sets of icons from the hierarchy, corresponding to selectable successive icons, in successive timed loops in successive fields on the display, and
detecting a selection of each selectable successive icon, wherein
each successive field is distinct from each other successive field and from the first and second fields.

14. The method as claimed in claim 13, further comprising:
terminating each successive timed loop as each selectable successive icon is selected, while continuing to display each selected successive icon in each successive field.

15. The method as claimed in claim 8, further comprising:
partitioning the display into distinct display fields, and
allocating two of the distinct display fields to form the first and second fields of the display.

16. The method as claimed in claim 8, wherein each of the first and second fields of the display has a size that is independent of a quantity of icons in each of the first and second sets of icons,
thereby allowing each icon of each of the first and second sets of icons to be sized independent of the quantity of icons in each of the first and second sets of icons.

17. A method of displaying icons from a hierarchy of sets of icons, comprising:
sequentially displaying each icon of a first set of icons in a first field of a display wherein the first field is configured to contain a single first icon as a currently displayed first icon,
identifying each currently displayed icon in the first field as a first icon,
identifying a second set of icons in the hierarchy corresponding to the first icon, and
sequentially displaying each icon of the second set of icons in a second field of the display, the second field being distinct from the first field,
such that the first icon is persistently displayed in the first field while the second set of icons are sequentially displayed in the second field.

18. The method of claim 17, further including
facilitating a user selection of a currently displayed icon in at least one of the first field and the second field, and
terminating the corresponding sequential display to continually display the selected currently displayed icon.

19. The method of claim 17, further including
partitioning a display area of the display to define at least the first field and the second field.

20. The method of claim 17, further including
displaying an information item that is associated with the currently displayed icon in the second field in another field that is distinct from the first field and the second field.

* * * * *